US007808496B2

(12) United States Patent
Woo et al.

(10) Patent No.: US 7,808,496 B2

(45) Date of Patent: Oct. 5, 2010

(54) APPARATUS FOR SUPPLYING POWER SOURCE

(75) Inventors: Kyoung Don Woo, Gunpo (KR); Hak Su Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 846 days.

(21) Appl. No.: 11/430,042

(22) Filed: May 9, 2006

(65) Prior Publication Data

US 2006/0267973 A1 Nov. 30, 2006

(30) Foreign Application Priority Data

May 12, 2005 (KR) ...................... 10-2005-0039599
Sep. 16, 2005 (KR) ...................... 10-2005-0086708

(51) Int. Cl.
*G06F 3/038* (2006.01)
*G09G 5/00* (2006.01)

(52) U.S. Cl. ....................... 345/211; 345/212; 345/213; 345/1.1; 345/1.2; 345/1.3

(58) Field of Classification Search ......... 345/211–213, 345/1.1–1.3
See application file for complete search history.

(56) References Cited

U.S. PATENT DOCUMENTS 4,338,531 A * 7/1982 Corso ......................... 327/308
6,369,558 B2 * 4/2002 Umemoto ................... 323/282
2004/0252096 A1 * 12/2004 Wang et al. ................. 345/102
2005/0116655 A1 * 6/2005 Yazawa .................. 315/169.3

FOREIGN PATENT DOCUMENTS

CN 1541439 A 10/2004
WO WO 03/038981 A1 5/2003

* cited by examiner

*Primary Examiner*—Amr Awad
*Assistant Examiner*—Andre Matthews
(74) *Attorney, Agent, or Firm*—Morgan Lewis & Bockius LLP

(57) ABSTRACT

The present invention relates to an apparatus for supplying power source for providing certain voltage to a first display device and a second display device. The apparatus for supplying power source includes a boosting circuit, a boosted voltage detecting circuit and an output selecting circuit. The boosting circuit boosts a battery voltage. The boosted voltage detecting circuit detects the boosted battery voltage, and transmits the detection result to the boosting circuit. The output selecting circuit is coupled to the boosting circuit and the boosted voltage detecting circuit, and provides selectively the boosted battery voltage to a first display device and a second display device. The apparatus provides certain voltage to a first display device and/or a second display device, and thus the size of a dual panel apparatus employing the display devices may be reduced.

6 Claims, 5 Drawing Sheets

APPARATUS FOR SUPPLYING POWER SOURCE

BACKGROUND OF THE INVENTION

1. Field of the Invention

The present invention relates to an apparatus for supplying power source. More particularly, the present invention relates to an apparatus for supplying power source for providing power source to a first display device and a second display device.

2. Description of the Related Art

An apparatus for supplying power source means apparatus for supplying power source required for driving a display device to the display device.

FIG. 1 is a view illustrating circuitry of a common apparatus for supplying power source.

In FIG. 1, the apparatus for supplying power source 100 includes a boosting circuit 106 and a boosted voltage detecting circuit 108.

The boosting circuit 106 includes a boosting integrated chip 110, an inductor L and a diode D.

The boosting integrated chip 110 boosts a battery voltage outputted from a battery 102, e.g. voltage of 3.7V up to a predetermined voltage, e.g. 18V. Accordingly, a first node N1 has the voltage boosted by the boosting circuit 106, and the voltage of the first node N1 is provided to the display device 104.

The boosted voltage detecting circuit 108 detects the battery voltage boosted by the boosting circuit 106, i.e. the voltage of the first node N1 and a voltage of a second node N2, and then provides the voltage of the second node N2 to a feedback terminal FB of the boosting integrated chip 110. The boosted voltage detecting circuit 106 includes resistors R1 and R2 and capacitors C1 and C2.

The capacitors C1 and C2 make the voltage of the first node N1 provided to the display device 104 stabilize.

The boosting integrated chip 110 adjusts its boosting rate in accordance with the voltage of the second node N2 provided from the boosted voltage detecting circuit 108.

In brief, the apparatus for supplying power source 100 provides a predetermined voltage to only one display device 104.

However, recently, a dual panel apparatus such as a mobile terminal and a laptop, etc. employs two display devices, and thus should include two apparatuses for supplying power source for driving the display devices. Accordingly, the size of the dual panel apparatus may be increased.

SUMMARY OF THE INVENTION

It is a feature of the present invention to provide an apparatus for supplying power source for providing power source to a plurality of display devices.

An apparatus for supplying power source includes a boosting circuit, a boosted voltage detecting circuit and an output selecting circuit. The boosting circuit boosts a battery voltage. The boosted voltage detecting circuit detects the boosted battery voltage, and transmits the detection result to the boosting circuit. The output selecting circuit is coupled to the boosting circuit and the boosted voltage detecting circuit, and provides selectively the boosted battery voltage to a first display device and a second display device.

An apparatus for supplying power source according to another embodiment of the present invention includes a boosting circuit, a voltage adjusting circuit and an outputting circuit. The boosting circuit boosts a battery voltage. The voltage adjusting circuit controls the boosting circuit so that the boosting circuit boosts the battery voltage up to a first voltage or a second voltage. The outputting circuit provides the first voltage to a first display device, downs the second voltage, and provides the downed second voltage to a second display device.

As described above, the apparatus for supplying power source provides certain voltage to a first display device and/or a second display device, and thus the size of a dual panel apparatus employing the display devices may be reduced.

BRIEF DESCRIPTION OF THE DRAWINGS

The above and other features and advantages of the present invention will become readily apparent by reference to the following detailed description when considered in conjunction with the accompanying drawings wherein.

DESCRIPTION OF EMBODIMENTS

Hereinafter, the preferred embodiments of the present invention will be explained in more detail with reference to the accompanying drawings.

Figure 1:
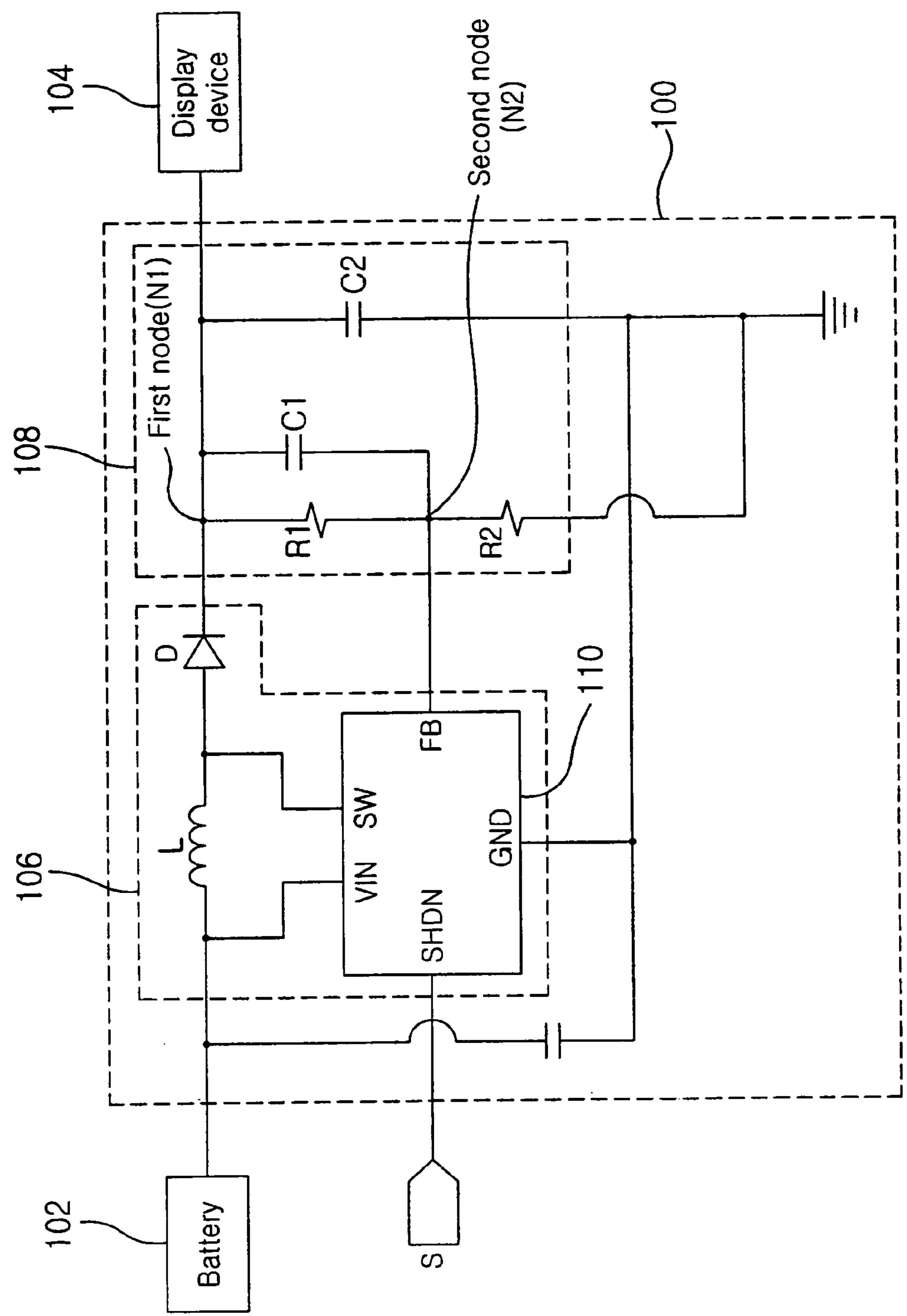
FIG. 1 is a view illustrating circuitry of a common apparatus for supplying power source.
Figure 2:
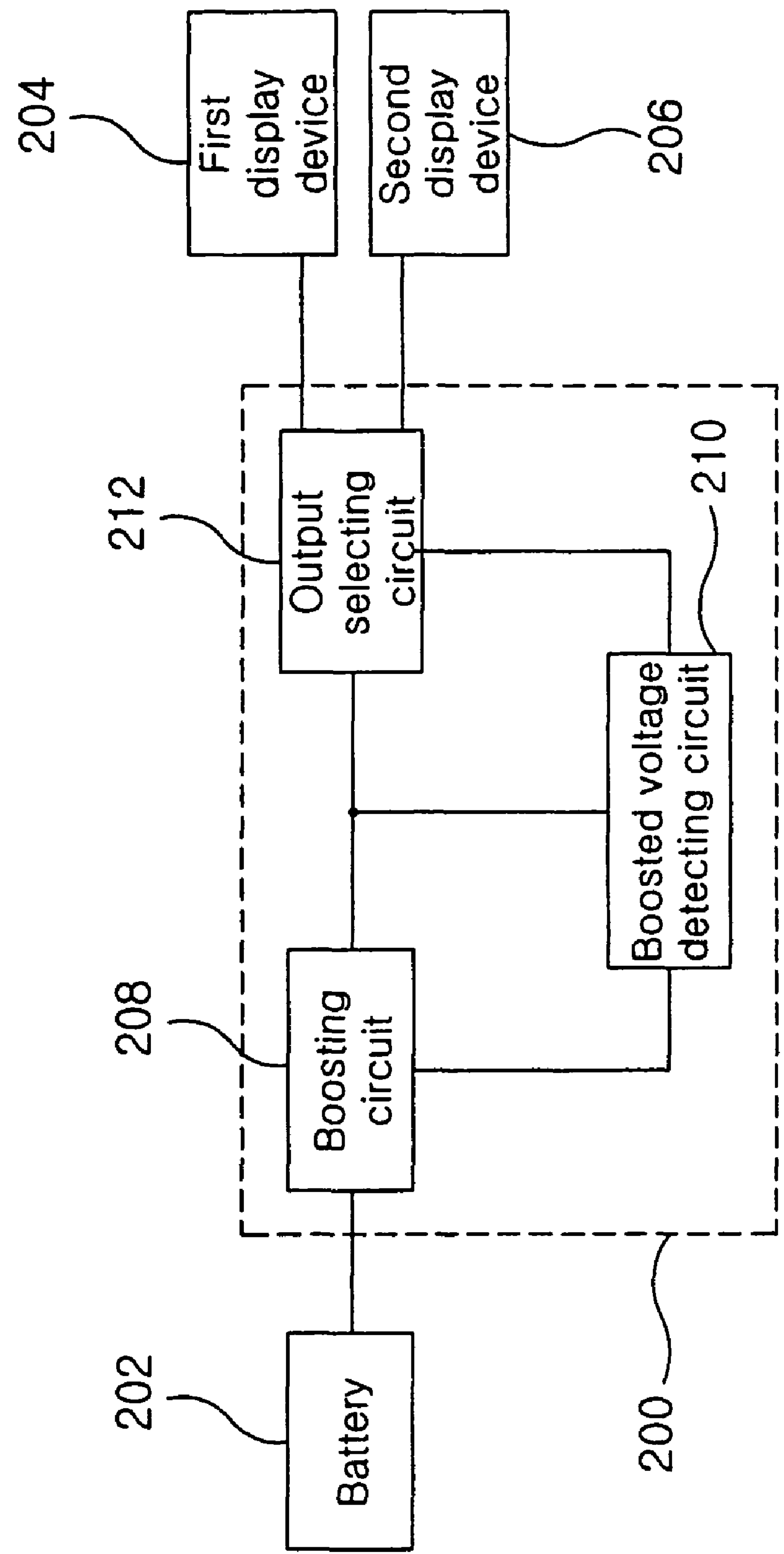
FIG. 2 is a block diagram illustrating an apparatus for supplying power source according to one embodiment of the present invention.

FIG. 2 is a block diagram illustrating an apparatus for supplying power source according to one embodiment of the present invention.

In FIG. 2, the apparatus for supplying power source 200 of the present invention includes a boosting circuit 208, a boosted voltage detecting circuit 210 and an output selecting circuit 212.

The boosting circuit 208 boosts a battery voltage outputted from a battery 202 up to a desired voltage. For example, in case that a voltage of 20V is preset to be provided to a first display device 204, the boosting circuit 208 boosts the battery voltage, e.g. voltage of 3.7V up to 20V. For another example, in case that a voltage of 18V is preset to be provided to a second display device 206, the boosting circuit 208 boosts the battery voltage of 3.7V up to 18V.

In one embodiment of the present invention, the first display device 204 is liquid crystal display, and the second display device 206 is organic electroluminescent device.

In another embodiment of the present invention, each of the display devices 204 and 206 is organic electroluminescent device.

In still another embodiment of the present invention, the display devices 204 and 206 may be employed as display sections of a mobile terminal.

The boosted voltage detecting circuit 210 detects the battery voltage boosted by the boosting circuit 208, and transmits the detection result to the boosting circuit 208. The boosting circuit 208 analyzes the detection result transmitted from the boosted voltage detecting circuit 210, and adjusts its boosting ratio, e.g. duty ratio in accordance with the analysis.

For instance, a voltage to be provided to the first display device 204 is preset to be 18V.

The boosting circuit 208 boosts the battery voltage, e.g. voltage of 3.7V up to a voltage of 17.5V. In this case, the boosted voltage detecting circuit 210 detects the battery voltage boosted up to 17.5V, and transmits the detection result to the boosting circuit 208.

Subsequently, the boosting circuit 208 detects that the battery voltage is boosted up to 17.5V through the detection result transmitted from the boosted voltage detecting circuit 210, and increases its boosting ratio in order to boost the battery voltage up to 18V. For example, if the boosting circuit 208 boosts the battery voltage by using on/off ratio of switch (not shown) included therein, i.e. duty ratio, the boosting circuit 208 boosts its duty ratio in accordance with the detection result transmitted from the boosted voltage detecting circuit 210. In other words, the boosting circuit 208 boosts the battery voltage up to 18V by adjusting its duty ratio.

The apparatus 200 of the present invention boosts the battery voltage up to a desired voltage through the above process.

The output selecting circuit 212 is coupled to the boosting circuit 208 and the boosted voltage detecting circuit 210, and provides the battery voltage boosted by the boosting circuit 208 to the first display device 204 or the second display device 206.

Hereinafter, operation of the output selecting circuit 212 will be described in detail with reference to a mobile terminal.

The mobile terminal employs the first display device 204 as main display section, and employs the second display device 206 as sub display section.

In case that the mobile terminal is folder-typed terminal and folder of the mobile terminal is open, the first display device 204 is turned on and the second display device 206 is turned off. In this case, the output selecting circuit 212 of the apparatus 200 of the present invention provides the battery voltage boosted by the boosting circuit 208 to the first display device 204.

Whereas, in case that the mobile terminal operates under condition of closing the folder thereof, the first display device 204 is turned off, and the second display device 206 is turned on. In this case, the output selecting circuit 212 provides the battery voltage boosted by the boosting circuit 208 to the second display device 206.

On the other hand, the boosting degree of the battery voltage is determined by the boosting circuit 208 and the boosted voltage detecting circuit 210. This will be described in detail with reference to accompanying drawings.

In short, the apparatus for supplying power source 200 of the present invention may provide power source to the first display device 204 or the second display device 206 unlike the apparatus for supplying power source described in Related Art. Accordingly, in case that a dual panel apparatus, e.g. mobile terminal employs the apparatus 200 of the present invention, the apparatus 200 may supply power supply to the first display device 204 and the second display device 206. As a result, the size of the dual panel apparatus may be reduced.

Figure 3:
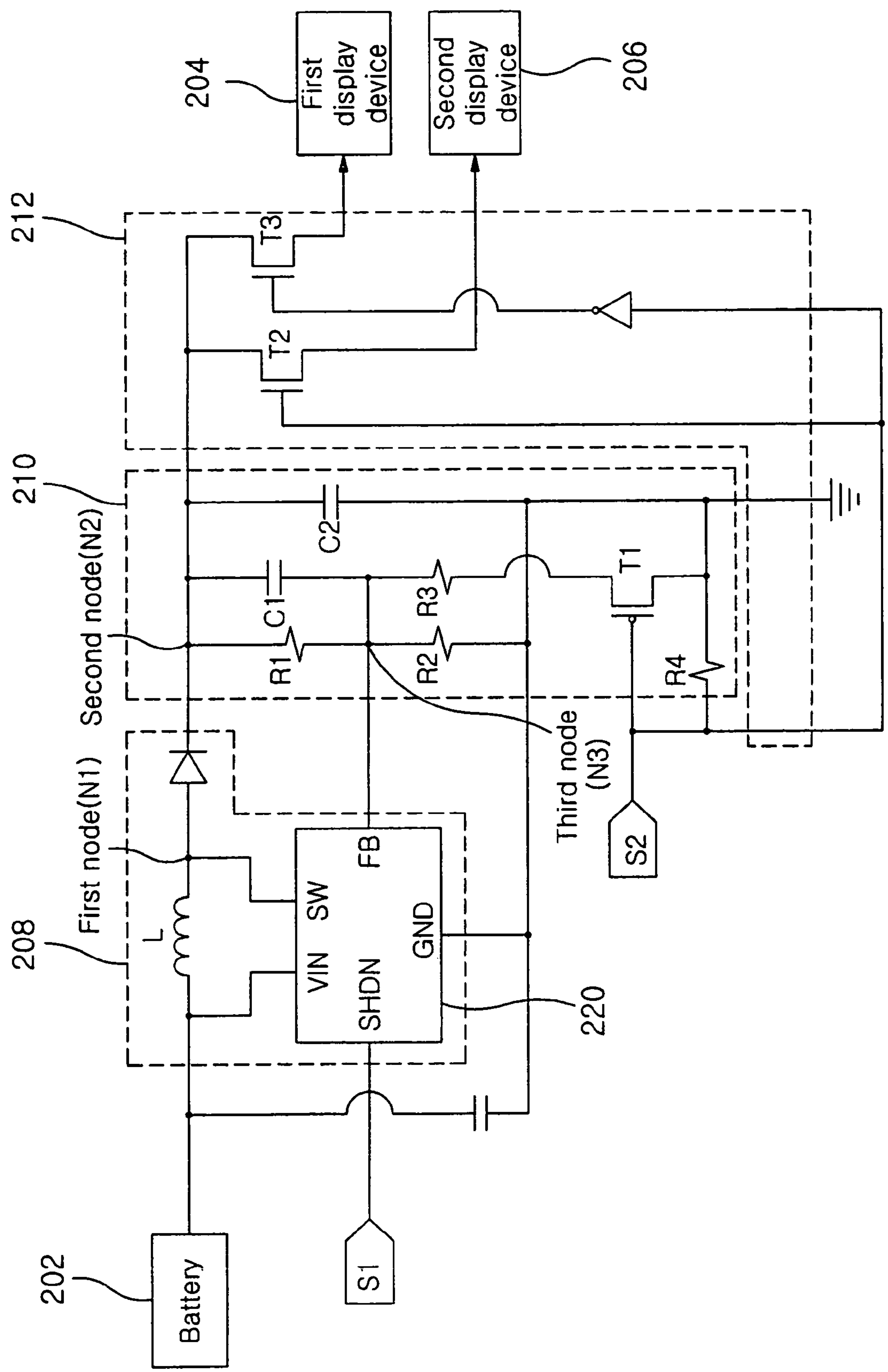
FIG. 3 is a view illustrating a circuitry of the apparatus for supplying power source of FIG. 2.

FIG. 3 is a view illustrating a circuitry of the apparatus for supplying power source of FIG. 2 according to one embodiment of the present invention.

In FIG. 3, the boosting circuit 208 includes a boosting integrated chip 220 activated in accordance with a controlling signal provided from a first signal terminal S1, an inductor L and a diode D.

The boosted voltage detecting circuit 210 is coupled to the boosting circuit 208, and includes a first resistor R1, a second and third resistors R2 and R3, a first switch T1 and capacitors C1 and C2. Here, the resistors R2 and R3 are coupled to the first resistor R1, and are coupled in parallel each other.

The output selecting circuit 212 includes a second switch T2 and an inverter coupled to the first switch T1, and a third switch T3 coupled in serial to the inverter.

Hereinafter, operation of the apparatus 200 of the present invention will be described in detail. Here, the first switch T1 is P-MOS transistor, each of the second and third switches T2 and T3 is N-MOS transistor. In addition, a voltage of 20V is provided to the first display device 204, and a voltage of 18V is provided to the second display device 206.

Firstly, the first switch T1 is turned off in accordance with a controlling signal provided from a second signal terminal S2. In this case, the second switch T2 is turned on, and the third switch T3 is turned off. Additionally, the boosted voltage detecting circuit 210 is made up of resistors R1 and R2 coupled in serial.

When the boosting circuit 208 boosts the battery voltage, the boosted voltage detecting circuit 210 detects a voltage of the third node N3. For example, when a voltage of the second node N2 is 18V, the voltage of the third node N3 is assumed to be 1.5V.

The boosted voltage detecting circuit 210 detects the voltage of the third node N3, e.g. detects the voltage of the third node N3 of 1.3V corresponding to the voltage of the second node N2 of 16V.

Subsequently, the boosted voltage detecting circuit 210 provides the voltage of the third node N3 of 1.3V to the FB of the boosting integrated chip 220. As a result, the boosting integrated chip 220 detects that the battery voltage is not boosted up to a predetermined voltage (18V), and so increases its boosting ratio.

The second node N2 has voltage of 18V through the above process, and the voltage of the second node N2 is provided to the second display device 206.

Secondly, in case that the first switch T1 is turned-on, the second switch T2 is turned off, and the third switch T3 is turned-on. Thus, the resistors R2 and R3 coupled in parallel are coupled to the first resistor R1.

Here, since the second and third resistors R2 and R3 are coupled in parallel each other, a resistance formed by the resistors R2 and R3 is smaller than that of the second resistor R2. As a result, the voltage of the third node N3 when the third resistor R3 is coupled to the second resistor R2 is smaller than that when the third resistor R3 is not coupled to the second resistor R2. For example, in case that the second node N2 has 16V, the voltage of the third node N3 when the third resistor R3 is not coupled to the second resistor R2 is 1.3V. Whereas, the voltage of the third node N3 when the third resistor R3 is coupled to the second resistor R2 is 1.2V. Hence, when the third resistor R3 is coupled to the second resistor R2, the boosting integrated chip 220 increases its boosting ratio more than boosting ration when the third resistor R3 is not coupled to the second resistor R2, and so the second node N2 has 20V higher than 18V. The voltage of 20V is provided to the first display device 204.

In short, the apparatus 200 of the present invention provides selectively voltages having different magnitude to the first display device 204 and the second display device 206 by using the first switch T1 and the resistors R2 and R3.

In the apparatus 200 according to anther embodiment of the present invention, the boosted voltage detecting circuit 210 may be include at least three resistors which are coupled to the first resistor R1, and are coupled in parallel one another.

Figure 4:
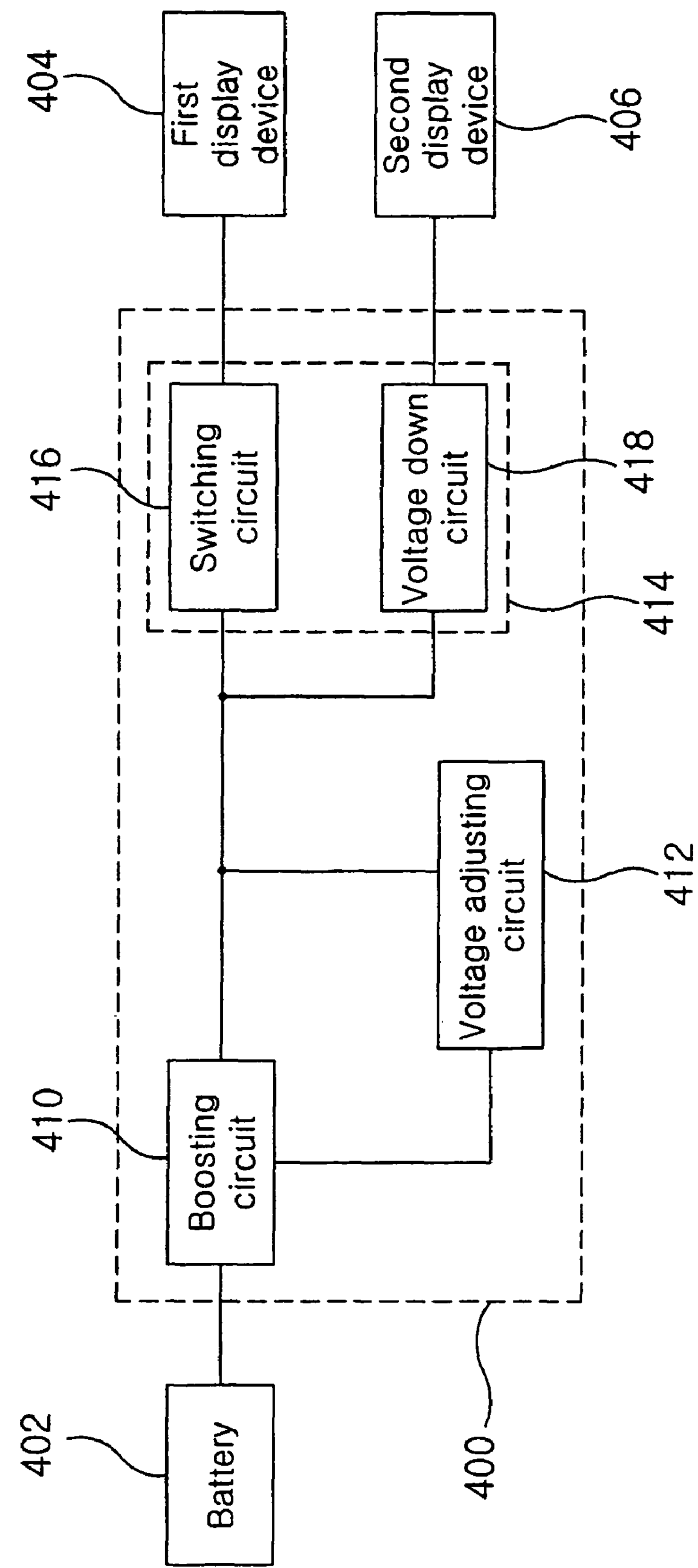
FIG. 4 is a block diagram illustrating an apparatus for supplying power source according to another embodiment of the present invention.

FIG. 4 is a block diagram illustrating an apparatus for supplying power source according to another embodiment of the present invention.

In FIG. 4, the apparatus for supplying power source 400 of the present invention includes a boosting circuit 410, a voltage adjusting circuit 412 and an outputting circuit 414.

The boosting circuit 410 boosts a battery voltage outputted from a battery 402 up to a desired voltage.

The voltage adjusting circuit 412 adjusts boosting ratio of the boosting circuit 410 so that the boosting circuit 410 boosts the battery voltage up to the desired voltage.

The outputting circuit 414 provides the battery voltage boosted by the boosting circuit 410 to a first display device 404 and/or a second display device 406, and has a switching circuit 416 and a voltage down circuit 418.

The switching circuit 416 switches couple between the boosting circuit 410 and the first display device 404, and provides the battery voltage boosted by the boosting circuit 410 to the first display device 404.

The voltage down circuit 418 downs the battery voltage boosted by the boosting circuit 410, and provides the downed voltage to the second display device 406.

Figure 5:
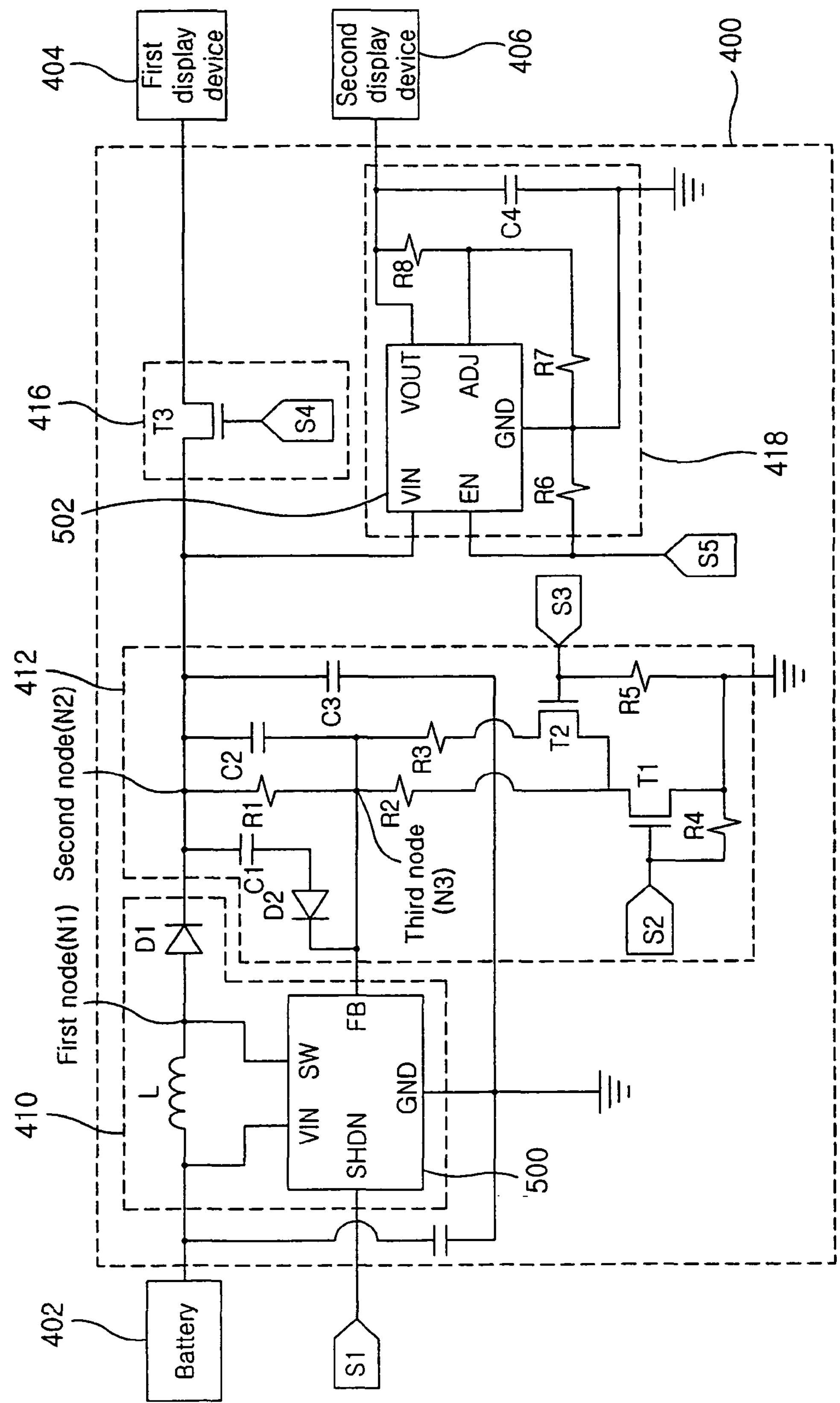
FIG. 5 is a view illustrating a circuitry of the apparatus for supplying power source of FIG. 4 according to one embodiment of the present invention.

FIG. 5 is a view illustrating a circuitry of the apparatus for supplying power source of FIG. 4 according to one embodiment of the present invention.

In FIG. 5, the boosting circuit 410 is made up of a boosting integrated chip 500, an inductor L and a first diode D1.

The boosting integrated chip 500 boosts the battery voltage outputted from the battery 402 using switch (not shown) included therein as described below.

Firstly, the switch is turned off, and so the battery voltage is stored in the inductor L.

Subsequently, the switch is turned on, and so charges charged in the inductor L is outputted to a first node N1.

Then, the switch is turned off, and so the battery voltage is stored in the inductor L.

Subsequently, the switch is turned on, and so charges charged in the inductor L is outputted to the first node N1.

In other words, the switch is repeatedly turned on/off, and so the battery voltage is boosted. As a result, the first node N1 has the boosted battery voltage. Here, on/off ratio of the switch means duty ratio.

Then, when the boosted battery voltage is more than threshold voltage of the first diode D1, current outputted from the inductor L is provided to a second node N2 through the first diode D1. As a result, the second node N2 has the battery voltage boosted by the boosting circuit 410.

Hereinafter, the elements of the apparatus 400 will be continuously described in detail.

The voltage adjusting circuit 412 includes a first capacitor C1, a second diode D2, a first resistor R1, a second resistor R2, a third resistor R3, a first switch T1, a second switch T2, a second capacitor C2 and a third capacitor C3.

The first capacitor C1 is coupled to the boosting circuit 410, and the second diode D2 is coupled to the first capacitor C1 and the boosting integrated chip 500. The first capacitor C1 and the second diode D2 make a voltage inputted to FB of the boosting integrated chip 500, i.e. voltage of a third node N3 stabilize.

The first resistor R1 is coupled to the boosting circuit 410, and the second resistor R2 is selectively coupled to the first resistor R1. In other words, when the first switch T1 is turned on by a controlling signal transmitted from a second signal terminal S2, the second resistor R2 is coupled in serial to the first resistor R1. However, when the first switch T1 is turned off, the second resistor R2 is not coupled to the first resistor R1. Accordingly, though the boosting integrated chip 500 has the same boosting ratio, voltage outputted from the boosting circuit 410 may be changed depending on couple of the resistors R1 and R2. Hence, in the apparatus 400 of the present invention, the boosting circuit 410 may output voltages having different magnitude using the same boosting ratio.

The third resistor R3 is coupled in parallel to the second resistor R2 when the second switch T2 is turned on in accordance with a controlling signal provided from a third signal terminal S3. In other words, the third resistor R3 is resistor used for adjusting the boosting ratio of the boosting circuit 410.

In the apparatus 400 according to one embodiment of the present invention, each of the switches T1 and T2 is MOS transistor, preferably N-MOS transistor.

In the apparatus 400 according to another embodiment of the present invention, a fourth resistor R4 may be coupled between a gate terminal of the first transistor T1 and a ground in order to protect the first transistor T1. In addition, a fifth resistor R5 may be coupled between a gate terminal of the second transistor T2 and the ground so as to protect the second transistor T2.

The second and third capacitors C2 and C3 make voltage provided to the display devices 404 and 406, i.e. voltage of the second node N2 stabilize.

The switching circuit 416 includes a third switch T3, e.g. MOS transistor switching in accordance with a controlling signal transmitted from a fourth signal terminal S4.

The voltage down circuit 418 includes an LDO (Low Drop-Out) regulator 502 for downing the voltage outputted from the boosting circuit 410, a seventh resistor R7 coupled between a ground terminal GND and an output voltage adjusting terminal ADJ of the LDO regulator 502, and an eighth resistor R8 coupled between the ADJ and the second display device 406.

The voltage down circuit 418 adjusts the voltage outputted from the boosting circuit 410 inputted to a voltage input terminal VIN of the LDO regulator 502 using the resistors R7 and R8 coupled to the ADJ of the LDO regulator 502. In particular, the LDO regulator 502 is turned on in accordance with a controlling signal transmitted from a fifth signal terminal S5 coupled to an enable terminal EN of the LDO regulator 502, and then the voltage outputted from the boosting circuit 410 is inputted to the LDO regulator 502. As a result, the LDO regulator 502 downs the voltage outputted from the boosting circuit 410 to a desired voltage in accordance with the resistors R7 and R8.

In addition, the voltage down circuit 418 may further include a sixth resistor R6 and a fourth capacitor C4.

The sixth resistor R6 as full down resistor is coupled between the EN and the ground terminal GND of the LDO regulator 502, and stabilizes a digital signal inputted to the ground terminal GND of the LDO regulator 502.

The fourth capacitor C4 stabilizes a voltage outputted from the LDO regulator 502 provided to the second display device 406.

Hereinafter, operation of the apparatus 400 of the present invention will be described in detail.

In a first embodiment, the switching circuit 416 is turned on, and the LDO regulator 502 is not activated in accordance with a controlling signal transmitted from the fifth signal terminal S5. Additionally, when the battery voltage, e.g. voltage of 3.7V is boosted up to 20V, the third node N3 is assumed to have 9V.

In this case, the first switch T1 and the second switch T2 are turned on. Here, in case that the battery voltage boosted by the boosting circuit 410 is 16V, the voltage adjusting circuit 412 detects that the voltage of the third node N3 is 7V in accordance with distribution of the resistors R1 to R3.

Subsequently, the voltage adjusting circuit 412 provides the detected voltage of the third node N3 to the FB of the boosting integrated chip 500.

In this case, the boosting integrated chip 500 detects that the battery voltage is not boosted up to a desired voltage (20V) through the detected voltage of the third node N3 provided from the voltage adjusting circuit 412. Accordingly, the boosting integrated chip 500 boosts the battery voltage up to the desired voltage (20V) by adjusting its duty ratio. Here, the boosted battery voltage of 20V is provided to the first display device 404 through the switching circuit 416.

In a second embodiment, the switching circuit 416 is turned off, and the LDO regulator 502 is activated in accordance with a controlling signal transmitted from the fifth signal terminal S5. Additionally, when the battery voltage, e.g. voltage of 3.7V is boosted up to 18V, the third node N3 is assumed to have 9V.

In this case, the first switch T1 is turned on, and the second switch T2 are turned off. Here, in case that the battery voltage boosted by the boosting circuit 410 is 16V, the voltage adjusting circuit 412 detects that the voltage of the third node N3 is 8V in accordance with distribution of the resistors R1 and R2.

Subsequently, the voltage adjusting circuit 412 provides the detected voltage of the third node N3 to the FB of the boosting integrated chip 500.

In this case, the boosting integrated chip 500 detects that the battery voltage is not boosted up to a desired voltage (18V) through the voltage of the third node N3 provided from the voltage adjusting circuit 412. Accordingly, the boosting integrated chip 500 boosts the battery voltage up to the desired voltage (18V) by adjusting its duty ratio. Here, the boosted battery voltage of 18V is downed by the voltage down circuit 418, and then the downed voltage is provided to the second display device 406.

Hereinafter, a method in the first embodiment and a method in the second embodiment will be compared.

In the first embodiment, since the first and second switches T1 and T2 are turned on, the resistors R2 and R3 are coupled in parallel each other. However, in the second embodiment, since the first switch T1 is turned on and the second switch T2 is turned off, only the second resistor R2 of the resistors R2 and R3 is activated. Therefore, when the battery voltage boosted by the boosting circuit 410 is 16V, the third node N3 has 7V in the first embodiment, but has 8V in the second embodiment. As a result, the battery voltage boosted by the boosting circuit 410 is 20V in the first embodiment, but is 18V in the second embodiment. Accordingly, the boosted battery voltage of 20V is provided to the first display device 404. In addition, the boosted battery voltage of 18V is downed by the voltage down circuit 418, and then the downed voltage is provided to the second display device 406.

In the second embodiment, if the second switch T2 is turned on like the first embodiment, the boosted battery voltage is 20V. Then, the boosted battery voltage of 20V is downed by the voltage adjusting circuit 418, and the downed voltage is provided to the second display device 406.

Accordingly, in the second embodiment, power consumption of the apparatus 400 when the second switch T2 is turned on is higher than that of the apparatus 400 when the second switch T2 is turned off. Hence, in the second embodiment, the second switch T2 is turned off, and so power consumption of the apparatus 400 may be reduced.

In brief, the apparatus 400 of the present invention reduces its power consumption by properly combining the resistors R1 to R3. For example, in case that the first display device 404 is main display section of a dual panel apparatus, a first voltage is provided to the first display device 400. However, in case that the second display device 406 is sub display section of the dual panel apparatus, a second voltage smaller than the first voltage is downed so as to enhance power consumption of the apparatus 400, and then the downed voltage is provided to the second display device 406.

In a third embodiment, the switching circuit 416 is turned on, and the LDO regulator 502 is activated in accordance with a controlling signal transmitted from the fifth signal terminal S5.

In this case, the battery voltage boosted by the boosting circuit 410, e.g. voltage of 20V is provided to the first display device 404. Additionally, the boosted battery voltage of 20V is downed by the voltage down circuit 418, and then the downed voltage is provided to the second display device 406.

In short, the apparatus for supplying power source 400 of the present invention may provide corresponding power source to the first display device 404 and/or the second display device 406 of the dual panel apparatus.

From the preferred embodiments for the present invention, it is noted that modifications and variations can be made by a person skilled in the art in light of the above teachings. Therefore, it should be understood that changes may be made for a particular embodiment of the present invention within the scope and the spirit of the present invention outlined by the appended claims.

What is claimed is:

1. An apparatus for supplying power source comprising: a boosting circuit configured to boost a battery voltage and including a first node to which the boosted battery voltage is outputted, and a first signal terminal to which a first controlling signal is inputted;

a boosted voltage detecting circuit configured to detect the boosted battery voltage, and transmit the detection result to the boosting circuit; and an output selecting circuit coupled to the boosting circuit and the boosted voltage detecting circuit, and configured to provide selectively the boosted battery voltage to a first display device and a second display device, wherein the boosted voltage detecting circuit includes a second node connected to the first node, a third node transmitting the detection result detected by the boosted voltage detecting circuit to the boosting circuit, a first resistor and a first capacitor connected in parallel to each other between the second node and the third node, a second resistor connected between the third node and a ground, a third resistor and a first switch connected in series between the third node and the ground, and a second capacitor connected between the second node and the ground, wherein the output selecting circuit includes a second switch connected between the second node and the second display device, and a third switch connected between the second node and the first display device, and the first and the second switches are controlled by a second controlling signal from a second signal terminal, and wherein the boosted voltage detecting circuit, the second switch and the second display device are sequentially connected in series, and the boosted voltage detecting circuit, the third switch and the first display device are sequentially connected in series, wherein the output selecting circuit further includes an inverter which provides a reversed signal of the second controlling signal to the third switch, wherein in case of the first switch is turned off, the second switch is turned on, the third switch is turned off, the second display is turned on the first display is turned off, and the first resistor is coupled with the second resistor in serial, wherein in case of the first switch is turned on, the second switch is turned off, the third switch is turned on, the second display is turned off, the first display is turned on, the second and third resistors are coupled to each other in parallel, and the first resistor is coupled to the third node in serial.

2. the apparatus of claim 1, wherein at least one of the switches are MOS transistor.

3. The apparatus of claim 1, wherein the second and third switches are same MOS transistor.

4. The apparatus of claim 1, wherein the first switch is P-MOS transistor.

5. The apparatus of claim 1, wherein the first display device is a first display section of a dual panel apparatus, and the second display device is a second display section of the dual panel apparatus.

6. The apparatus of claim 5, wherein the first display device is liquid crystal display, and the second display device is organic electroluminescent device.

* * * * *